C. W. WALLER.
APPARATUS FOR PRESERVING PERISHABLE ARTICLES.
APPLICATION FILED MAR. 14, 1912.
1,064,796.
Patented June 17, 1913.
4 SHEETS—SHEET 2.
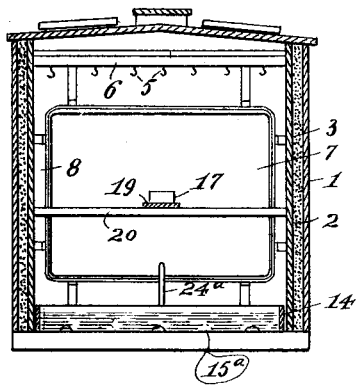
Fig. 3
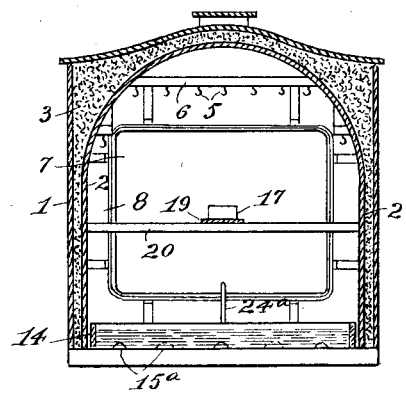
Fig. 4
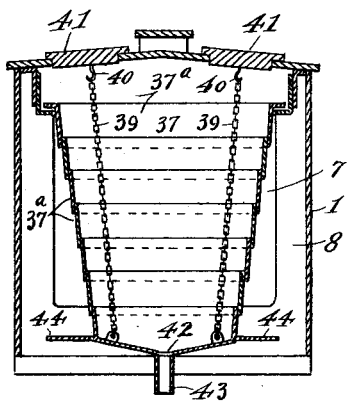
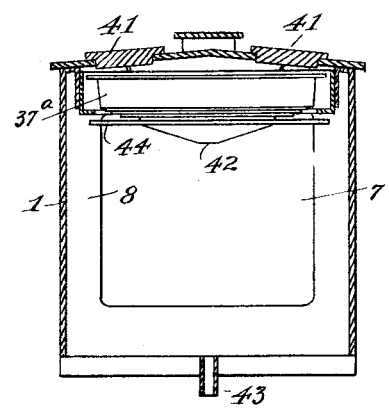
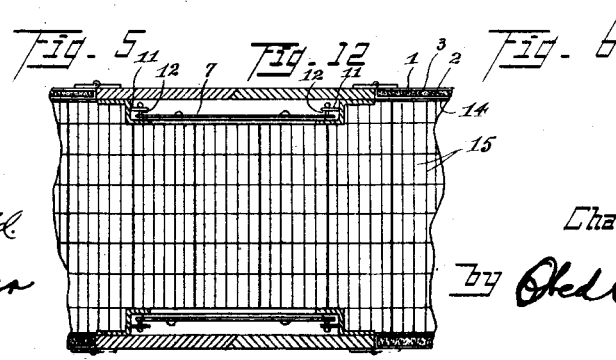
Fig. 5   Fig. 12   Fig. 6
Witnesses:
Inventor
Chas. W. Waller
by Ored G. Billman
Attorney

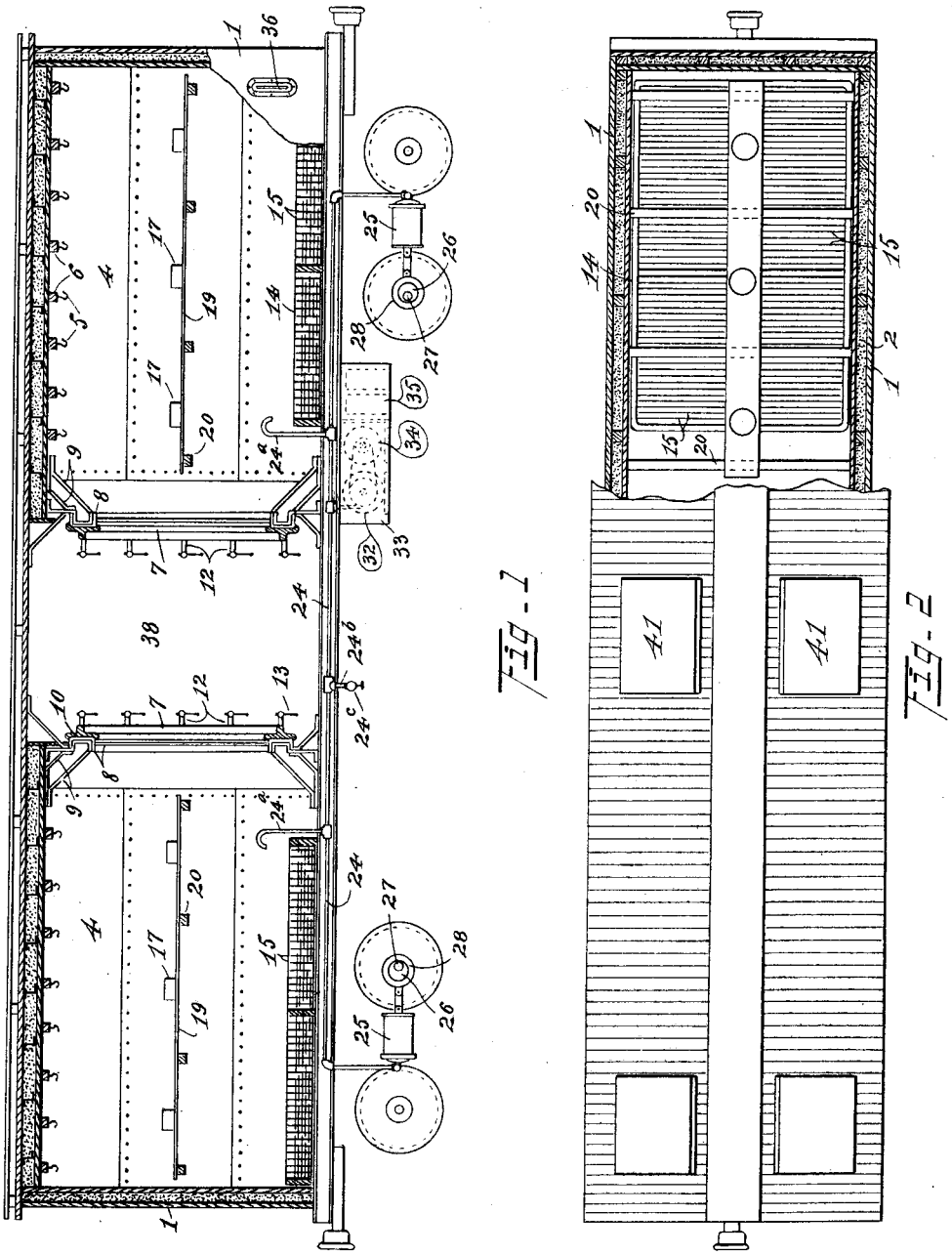

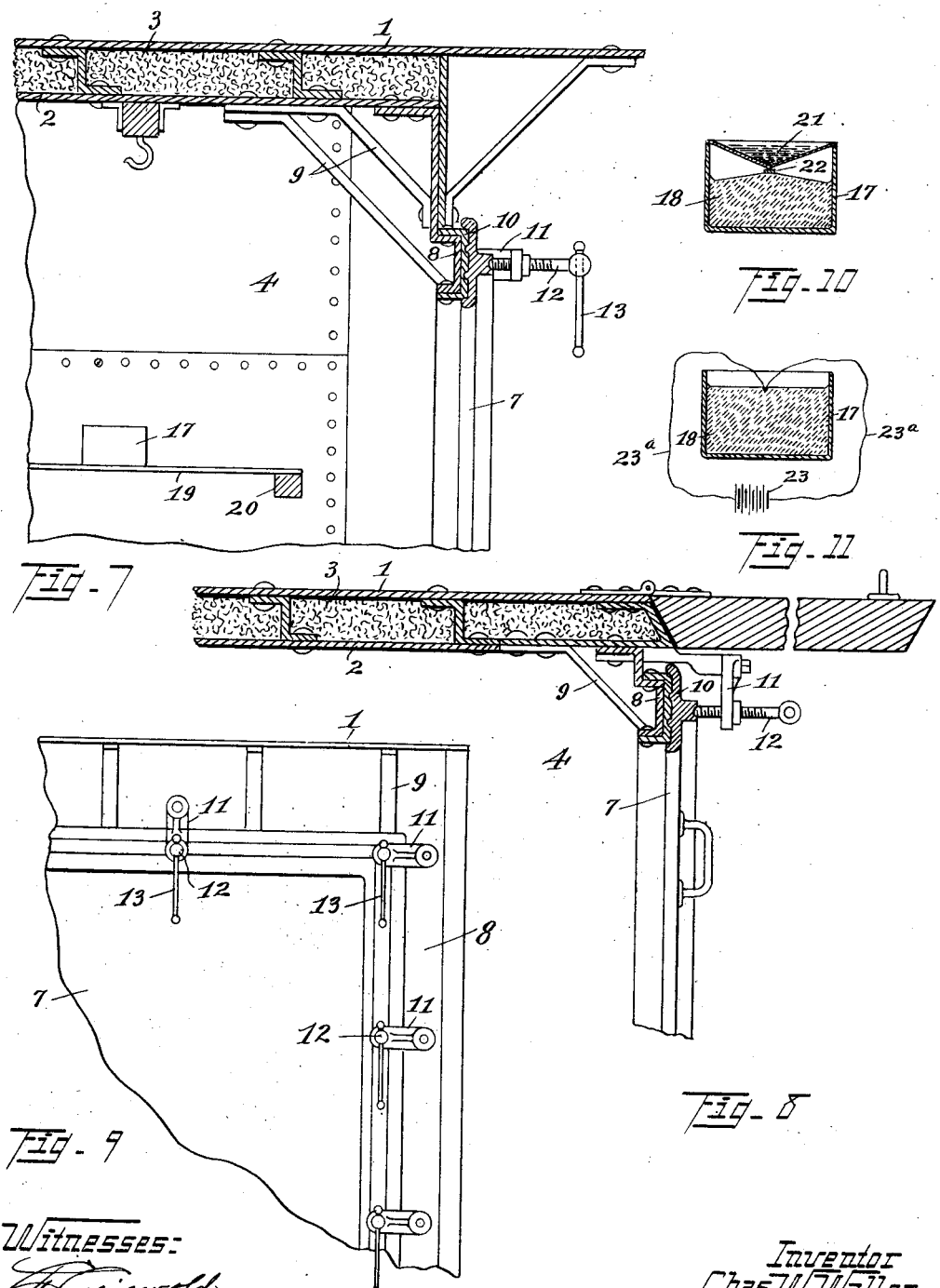

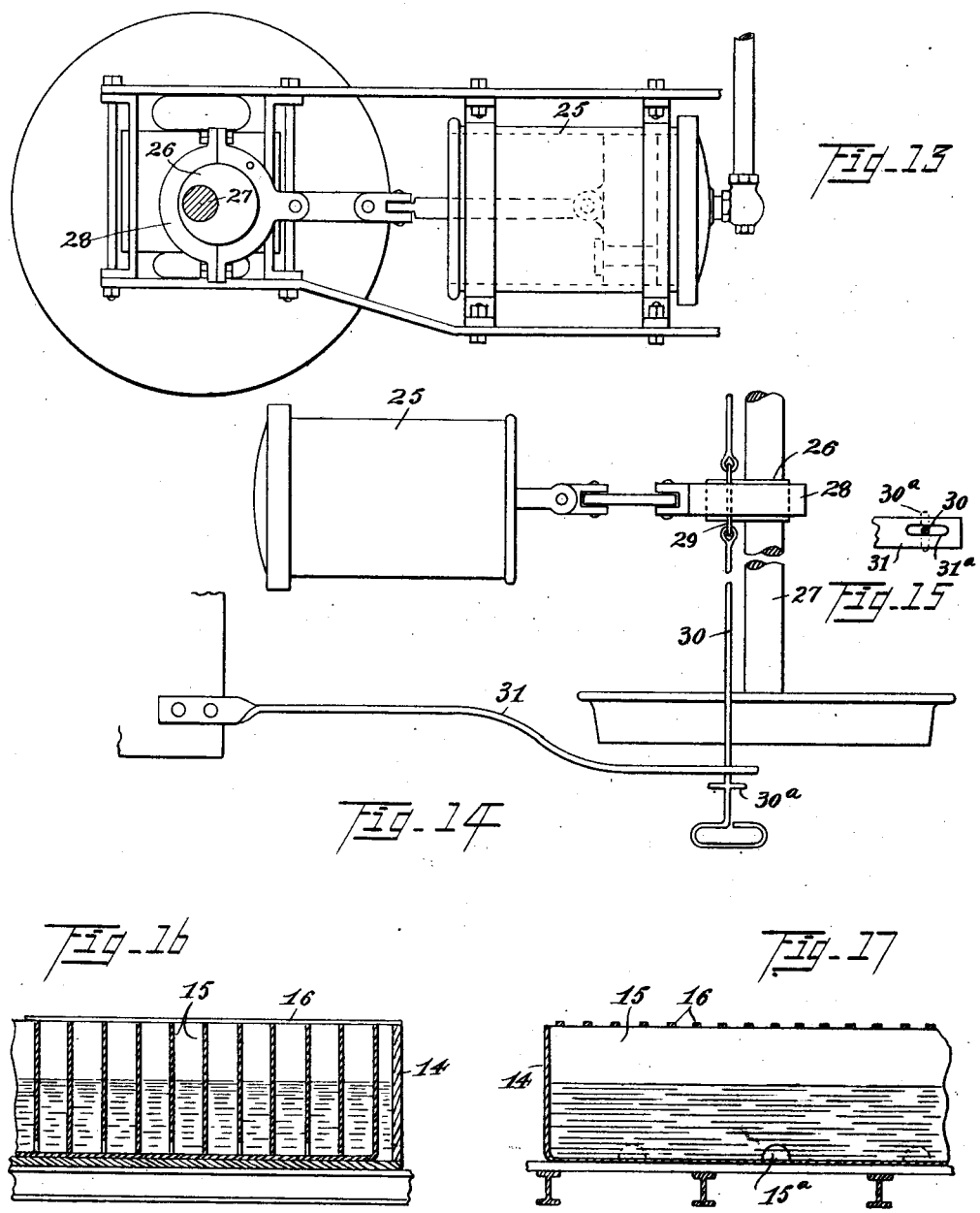

UNITED STATES PATENT OFFICE.

CHARLES W. WALLER, OF CHICAGO, ILLINOIS, ASSIGNOR OF ONE-FIFTH TO CLYDE M. PETERMAN, OF CHICAGO, ILLINOIS.

APPARATUS FOR PRESERVING PERISHABLE ARTICLES.

1,064,796.     Specification of Letters Patent.     Patented June 17, 1913.

Application filed March 14, 1912. Serial No. 683,684.

*To all whom it may concern:*

Be it known that I, CHARLES W. WALLER, a citizen of the United States, residing at Chicago, in the county of Cook and State of Illinois, have invented certain new and useful Improvements in Apparatus for Preserving Perishable Articles, of which the following is a specification.

My invention relates to improvements in apparatus for preserving perishable articles, the primary object of the invention being to provide a generally improved apparatus and method for preserving perishable articles such as foods, vegetables, and the like, the invention being particularly designed and adapted for use in preserving such perishable articles while in transit.

The methods now in use in connection with the shipping of perishable articles of all kinds (especially of foods) in refrigerator cars are very expensive as it costs approximately $16.00 to ice a car for a trip of one thousand miles so that the large firms shipping hundreds of ice cars a day would save a large sum of money daily by the use of my invention by which meats and other perishable articles can be shipped without the use of ice or other kind of refrigeration.

Various forms of bacteria are the cause of putrefaction or fermentative changes in meats and other perishable food articles. The atmosphere consists of a mixture of oxygen and nitrogen in the almost constant proportion of 20.81 volumes of oxygen, to 79.19 volumes of nitrogen, or, by weight 23.01 parts of oxygen to 76.99 parts of nitrogen. The gases are associated together not as a chemical compound but as a mechanical mixture. Upon the oxygen present depends the power of the atmosphere to support combustion and respiration, the nitrogen acting as a dilutant to prevent its too energetic action. Thus by extracting or drawing from the car as much of the atmosphere as possible by means of a vacuum pump, and absorbing as much as possible of the oxygen in the remaining atmosphere by means of sulfur fumes (which are given off from burning sulfur) the said oxygen and sulfurous oxid dissolve in the supply of liquid or water (which, in the present instance, I have placed in the bottom of the car or receptacle) thus cutting off the oxygen which is the power of supporting the life of the various forms of bacteria and thereby preventing putrefaction or fermentative changes in the meats or other perishable food articles in the car. Furthermore, by producing and maintaining a substantial vacuum in the car for which I have made provision as hereinafter pointed out, (thus keeping out the heat through which the various forms of bacterial growths are greatly assisted) these bacterial growths are either prevented or at least substantially checked.

In view of the above and with the above mentioned and other objects in view, my invention consists in the novel construction, and method of operation hereinafter described, illustrated in some of its embodiments in the accompanying drawings, and particularly pointed out in the appended claims.

Referring to the drawings forming a part of this specification, Figure 1, is a longitudinal vertical sectional view of a refrigerator car constructed in accordance with my invention. Fig. 2, a top plan view of the same, partly in horizontal section. Fig. 3, a cross sectional view taken through one of the end compartments. Fig. 4, a central view of a modified form of same. Fig. 5, a cross sectional view through the central compartment of the car or midway of the ends thereof showing a telescoping ice receptacle for icing the car for refrigeration when my improved method is not in use. Fig. 6, a central view of the same with the telescoping parts of the ice receptacle drawn up. Fig. 7, an enlarged longitudinal vertical sectional view of the upper end portion of one of the compartments showing how the inner or sealing door may be secured for rendering the compartment air tight. Fig. 8, a similar view showing a longitudinal horizontal sectional view of the adjacent side wall and door at this portion of the car. Fig. 9, a fragmentary end view of one of the inner or sealing doors and showing the manner of sealing or attaching the same. Fig. 10, a sectional view of one of the sulfur (or the like) receptacles or containers, and igniting device in the form of a gelatin covering or other soluble material adapted to form a small water pocket or receptacle and a small quantity of sodium peroxid or the like as an igniting device. Fig. 11, a similar view showing a method of lighting or igniting by means of electricity, as for example, by means of electrodes adapted to form a spark gap or the like. Fig. 12, a longitudinal sectional view showing a modified form of the central portion of the car in which the sealing doors are located at the sides of the car, thus giving more room and forming but one compartment. Fig. 13, a side elevation of a vacuum pump operated by means of an eccentric on one of the car axles. Fig. 14, a top plan view of the same, showing how the eccentric operating mechanism connected with the pump may be thrown into and out of operation from the side of the car. Fig. 15, a detail view of the slotted end of the supporting bar and hand slide bar and illustrating the manner of locating the latter in its respective positions. Fig. 16, a longitudinal vertical sectional view of a portion of one of the liquid or water containing receptacles or tanks in the bottom portion of the car. Fig. 17, a cross sectional view of the same.

Similar numerals of reference designate like parts throughout all the figures of the drawings.

For the purpose of illustration I have shown my invention embodying for use as a car in lieu of the ordinary refrigerator car, and it will, of course, be understood, that the same may be embodied in various forms for the preservation of perishable articles.

The car body 1, may be of any suitable and convenient form and may comprise outer and inner walls 1 and 2 spaced apart and suitably insulated by any suitable and convenient insulating material 3. The car body or fluid receptacle 1, should be fluid or air tight throughout, and may be divided into one or more fluid tight compartments or receptacles 4, for containing the articles to be preserved. Such perishable articles as meats may be conveniently hung up and suspended from hooks 5, carried by cross members 6, along the top of the car. As a means for hermetically sealing the receptacle or compartments 4, inner sealing plates or doors 7, may be provided, the marginal edges of said plates or doors being adapted to fit down upon flange members 8, forming the opening to the compartments or chambers 4, said flange members being braced, in the present instance, by means of brace members 9. The flange members 8, may be provided with packing or gasket members 10, and as a means for removably supporting and retaining the sealing plates or doors 7 in place, said flange members may be provided with a plurality of supporting brackets 11, carrying screw bolts 12, adapted to impinge on the outer face sides of the sealing plates or doors 7, and adapted to be drawn up by handles 13.

The chambers or compartments of the car body or receptacle are provided with a supply of liquid, in the present instance, carried in tanks 14, formed in the bottom portions of the compartments of the car, said tanks being provided with vertically disposed partitions 15 (preferably of sheet metal) extending crosswise from side to side provided along their bottom with openings 15ª, whereby the liquid or water in the tanks 14, will be allowed some circulation and yet be maintained at a substantially constant level without material change from the vibrations of the car or the raising and the lowering of the ends of the same while in motion. If desired, the tanks 14, may be covered with longitudinally extending strips 16, forming a grated flooring above the partitions 15 of the tanks, and upon which to walk while loading and unloading the car.

As a means for supplying the chamber portion of the car or receptacle with sulfur fumes, and thus absorbing or taking up the oxygen in the air within the chambers or compartments of the car after the same are sealed, a plurality of receptacles or containers 17, are arranged for the reception of a supply of sulfur 18, or the like, said receptacles or containers being suitably spaced throughout the interior of the car body or chamber portion and suitably supported, as for example, by means of a board member 19, supported on cross members 20. As a means for igniting the sulfur at a suitable time after the sealing of the car chambers or compartments, the containers may be provided with a covering of gelatin or other soluble material adapted to form a small water pocket or receptacle 21, and a small quantity of sodium peroxid 22, immediately beneath the same as shown in Fig. 10, so that the sulfur 18, will be ignited when the sodium peroxid is moistened by the contact of water therewith. Or, if desired, the sulfur 18, may be ignited by means of a source of electrical supply, as a battery 23, or the like, provided with wires 23ª, terminating in suitable electrodes adapted to form a spark gap as illustrated in Fig. 11 of the drawings. The sulfur fumes after taking up the oxygen in the air or atmosphere is adapted to be dissolved in the liquid in the tanks 14, below, thus removing the oxygen as a supporter of the life of bacteria and preventing the putrefaction and fermentative changes in the meats or other perishable articles in the car.

If desired, a large portion of the air atmosphere may be first withdrawn by the mechanism hereinafter described before the above mentioned process or method is commenced, or a substantial vacuum may be formed and maintained in lieu thereof by the mechanism hereinafter described.

As a means for withdrawing the air from the car chamber or compartments or for forming and sustaining a substantial vacuum therein, suction pipes 24, may be provided beneath the car, said suction pipes communicating with the interior of the car by means of branch intake pipes 24ª, and communicating with vacuum or exhaust pumps 25, suitably supported upon the car trucks and adapted to be operated by means of eccentric members 26, carried by the car axles 27. As a means for throwing said exhaust pumps into and out of operation, the eccentric bearing heads 28, passing around the eccentric members 26, are provided with loose link members 29, connected to handle rods 30, extending beneath and to the sides of the car and supported by means of supporting bars 31, (see Fig. 14). When it is desired to throw the eccentric bearing head off of the eccentric member 26 of the axle, one of the handle rods 30, is moved longitudinally whereby the cross bar portion 30ª thereof of one of the bars is passed through the slot 31ª, (see Fig. 15) after which the bar may be twisted, thereby holding the connected eccentric bearing head in disconnected position. If desired, the air may be exhausted by means of a pump 32, of the rotary type, as shown in Fig. 1, said pump being mounted, in the present instance, in a suitable casing 33, inclosing a motor 34, communicating with a suitable storage battery 35. If desired, before starting or placing the car in transit, the air may be exhausted through the medium of a stationary exhaust pump, the hose of which may be brought into communication with the suction pipe 24, through the branch pipe 24ᵇ thereof, the latter being normally closed by means of a valve 24ᶜ, as shown in Fig. 1 of the drawings. Barometers 36 (see Fig. 1) communicating with the car chamber near the ends thereof or otherwise suitably placed are adapted to indicate the amount of air in the car chamber in an obvious manner.

As an emergency supply of ice, an emergency ice tank 37, may be used in the central compartment 38, between the two end compartments, said ice tank being made up of a plurality of telescoping members 37ª, adapted to be lowered from the top of the car by means of chain members 39, as indicated in Fig. 5, of the drawings, the chain members, in the present instance, being connected to hooks 40, carried by the doors or covers 41, of the ice holes in the roof of the car, and communicating with the emergency ice tank 37. The bottom telescoping member 37 of the emergency ice tank is provided with a central drain pipe 43, as illustrated in Fig. 5, of the drawings, said bottom or lower telescoping member 37ª, being provided with flanges 44, adapted to contact with and elevate the several telescoping members 37ª, as the latter are drawn up or elevated when the ice tank 37, is not in use, as illustrated in Fig. 6, of the drawings.

From the foregoing description taken in connection with the accompanying drawings, the operation and advantages of my invention will be readily understood.

Having thus described some of the embodiments of my invention, what I claim and desire to secure by Letters Patent is,—

1. An apparatus for preserving perishable articles, comprising a fluid or air tight receptacle, a supply of sulfur therein, a supply of liquid, means for producing a partial vacuum in said receptacle, and electrical means for igniting said sulfur whereby the sulfur fumes given off by the latter absorb the oxygen in said receptacle and are dissolved in said liquid supply.

2. A car for preserving perishable articles, comprising a fluid tight car body provided with door openings intermediate the ends, liquid container tanks within said car body, removable doors for hermetically sealing said door openings, a supply of sulfur therein, means for electrically igniting said supply of sulfur, and axle actuated pump exhaust mechanism communicating with the interior of said car body and adapted to form a partial vacuum therein.

3. A car for preserving perishable articles, comprising a fluid tight car body provided with hermetically sealed doors, a supply of sulfur arranged within said car body, means for igniting said sulfur therein, a supply of liquid within said car body, and axle actuated vacuum pump mechanism and valved conduits communicating with the interior of said car body.

4. A car for preserving perishable articles, comprising a fluid tight car body, means within the latter for supplying sulfur fumes therein, means for hermetically sealing said car body, and axle actuated means for exhausting the fluid therefrom.

5. A car for preserving perishable articles, comprising a heat insulated rectangular car body, flange members forming door openings within the intermediate portions of said car body, sealing plates removably connected to said flange members forming end compartments, means for generating sulfur fumes within the latter after sealing, and exhaust mechanism communicating with said compartments and adapted to form and maintain a vacuum in said compartments.

In testimony whereof I have affixed my signature in presence of two witnesses.

CHARLES W. WALLER.

Witnesses:
THEODORE SAUER,
GEORGE GRUBLE.